UNITED STATES PATENT OFFICE.

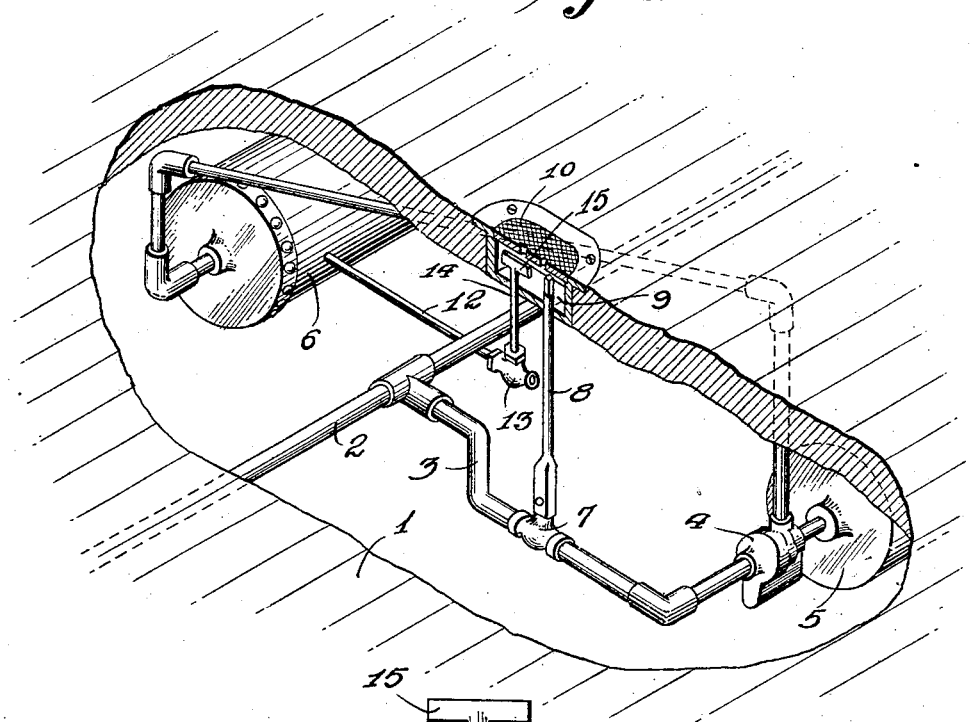

SIMON PETER COTA, OF DICKINSON, NORTH DAKOTA.

CUT-OUT AND RELEASE FOR AIR-BRAKE APPARATUS.

969,344.

Specification of Letters Patent.   Patented Sept. 6, 1910.

Application filed March 5, 1910.   Serial No. 547,603.

*To all whom it may concern:*

Be it known that I, SIMON P. COTA, a citizen of the United States, residing at Dickinson, in the county of Stark and State of North Dakota, have invented certain new and useful Improvements in Cut-Outs and Releases for Air-Brake Apparatus, of which the following is a specification, reference being had therein to the accompanying drawing.

This invention relates to air brake systems, and the principal object of the same is to provide means whereby the brake system of a car may be controlled so that its pressure may be reduced, or the system of the car cut out without the necessity of stopping the car.

The invention is an improvement on my Patent No. 943,769, issued December 21, 1909. In said patent, means are provided whereby the supply from the service pipe may be cut off and the pressure in the auxiliary reservoir reduced simultaneously by means of a rod that extends into the car so that the operation of cutting off the supply and reducing the pressure of the auxiliary reservoir can be performed by a trainman on the car without the necessity of stopping the car. As explained in said patent, the mechanism covered thereby is for the purpose of cutting out the brake system of a car in the event of the system developing dynamiting tendencies, and, obviously, by operating the same, the system of the car will be "cut-out." It has been found however, that in some cases a "dynamiter" may be cured by reducing the pressure of the auxiliary reservoir without entirely cutting out the brake system, and to provide a controlling mechanism for performing this function, is the primary object of this invention.

In carrying out the invention as generally stated above, it is contemplated providing the auxiliary reservoir with a valve controlled discharge pipe, the valve of which is located beneath the floor or platform of the car and the operating stem of the valve projecting into or above the floor or platform so that the valve may be readily manipulated without the necessity of the trainman leaving the car. As an adjunct to the same, means are provided whereby the branch pipe may be closed to cut off communication from the service pipe to the triple valve and auxiliary reservoir, said means being controllable from the car and preferably arranged adjacent to the means that controls the auxiliary reservoir, so that in the event of the defect in the system not being cured by reducing the pressure of the auxiliary reservoir, the branch pipe may be closed, thereby cutting out the brake system.

It will be understood of course that in the practical application of the invention, the same is susceptible of a wide range so far as detail and structural arrangements are concerned, but a preferred and simple embodiment of the same is shown in the accompanying drawings, wherein—

Figure 1 is a perspective view of a portion of a car floor shown broken away to illustrate the application of the present invention to the brake system. Fig. 2 is a detail fragmentary view in side elevation of the pressure reducing device.

Referring to said drawings by numerals, 1 designates the floor of a car, 2 the service pipe that extends longitudinally beneath the same. A branch pipe 3 connects the service pipe 2 with the triple valve chamber 4, and has the usual communications with a brake cylinder 5, and auxiliary reservoir 6. So far as described, the air brake system is the same as in common use. The branch pipe 3 is equipped with a controlling valve 7, as is shown in my patent mentioned in the foregoing, said valve having a controlling rod 8 projecting therefrom, that extends into a cup 9 seated in the floor 1 and has a squared end so that said rod may be grasped by the hand or by a turning tool to rotate the rod, and thereby operate the valve. A cover 10 is provided for said cup, said cover and the upper portion of the cup being flush with the upper surface of the floor 1. A release pipe 12 projects from said reservoir 6 and has its outer end equipped with a valve or cock 13 that is preferably located beneath the cup 9, and has an elongated operating stem 14 that projects into said cup and is equipped with a flattened handle 15.

As will be understood from the foregoing, valve 13 may be opened by manipulating the stem 14 to reduce the pressure of reservoir 6 in the event of the brake system developing dynamiting tendencies, this operation being performed from the car. And if the reduction of the pressure does not cure the defect in the brake system, the branch pipe may be closed by manipulating valve 7 through rod 8, thereby cutting out the system. It is to be understood, of course, that the valve 13 is located beneath the car so that the odor from the same, and the dust stirred thereby when open will not enter the car.

As has been shown, the stem 14 and the rod 15 enter the cup 9 that is seated in the floor 1, but it is to be understood that the same is but one convenient manner of disposing said stem and rod so that they will not interfere with the use of the car, and at the same time be accessible to the crew of the train. Obviously said stem and rod may be suitably disposed on the platform of a car in position where they will not be in the way and also not readily accessible to children or others who might tamper with the same.

It will be understood from the foregoing that the present invention differs from my before mentioned patent in that said patent provides means whereby the branch pipe is sealed and the pressure of the auxiliary reservoir simultaneously reduced by the operation of a single rod, whereas this invention provides independent means for performing such functions.

What I claim as my invention is:

1. A controlling device for the air brake system of a car, comprising a pipe having one end connected to the auxiliary reservoir, a valve carried by said pipe, and means operable from within the car for controlling said valve.

2. In an air brake system, the combination with the auxiliary reservoir and the branch pipe, of means operable from the car for reducing the pressure of said reservoir, and independent means also operable from the car for sealing said branch pipe.

3. In a pressure operated brake system for cars, the combination with the car, the auxiliary reservoir and the branch pipe, of a valve controlled pipe projecting from said reservoir, means operable from the car for controlling said valve, a valve for said branch pipe, and independent means operable from the car for controlling the valve of the branch pipe.

4. A controlling device for the air brake system of cars, comprising a pipe carried by the auxiliary reservoir, a valve at the outer end thereof, and an elongated stem for said valve projecting into and operable from within a car.

5. In a pressure operated brake system, the combination with the auxiliary reservoir and the branch pipe, of a release pipe for said reservoir, a valve carried thereby, a stem for said valve adapted to project into and be operated from a car, a valve for said branch pipe, and a rod carried thereby and adapted to project into and be operated from said car.

In testimony whereof I hereunto affix my signature in presence of two witnesses.

SIMON PETER COTA.

Witnesses:
LLOYD RADER,
JOHN LEASA.